(12) United States Patent
Bertagna

(10) Patent No.: US 12,741,622 B2
(45) Date of Patent: Sep. 22, 2026

(54) ADJUSTABLE PRESSURE SIMULATOR DEVICE FOR VEHICLE BRAKING SYSTEMS OF THE BRAKE-BY-WIRE TYPE

(71) Applicant: Brembo S.p.A., Curno (IT)

(72) Inventor: Alessandro Bertagna, Curno (IT)

(73) Assignee: Brembo S.p.A., Curno (IT)

( * ) Notice: Subject to any disclaimer, the term of this patent is extended or adjusted under 35 U.S.C. 154(b) by 284 days.

(21) Appl. No.: 17/757,833

(22) PCT Filed: Dec. 15, 2020

(86) PCT No.: PCT/IB2020/061930
§ 371 (c)(1),
(2) Date: Jun. 22, 2022

(87) PCT Pub. No.: WO2021/130603
PCT Pub. Date: Jul. 1, 2021

(65) Prior Publication Data

US 2023/0035196 A1 Feb. 2, 2023

(30) Foreign Application Priority Data

Dec. 23, 2019 (IT) ........................ 102019000025318

(51) Int. Cl.
*B60T 8/40* (2006.01)

(52) U.S. Cl.
CPC ........... *B60T 8/409* (2013.01); *B60T 2270/82* (2013.01)

(58) Field of Classification Search
CPC ..... B60T 8/4081; B60T 8/409; B60T 2270/82
See application file for complete search history.

(56) References Cited

U.S. PATENT DOCUMENTS 6,347,518 B1 * 2/2002 Kingston .............. B60T 8/4081 92/84
7,997,665 B2 * 8/2011 Nakazawa .............. B60T 8/368 303/DIG. 10

(Continued)

FOREIGN PATENT DOCUMENTS

CN 1419505 A 5/2003
CN 102294997 A 12/2011

(Continued)

OTHER PUBLICATIONS

Machine translation of JP 2004/330966, retrieved Mar. 7, 2025 (Year: 2025).*

(Continued)

*Primary Examiner* — Bradley T King
(74) *Attorney, Agent, or Firm* — Marshall & Melhorn, LLC

(57) ABSTRACT

An adjustable pressure simulator device for vehicle braking systems of the brake-by-wire type may have an absorber body enclosing a first cylinder and a second cylinder fluidically communicating with each other and at least partially filled with a fluid. The first cylinder houses a first piston subject to the thrust action of the fluid and biased by a first elastic device which opposes the thrust action applied by the fluid. The second cylinder houses a second piston subject to the thrust action of the fluid and biased by a second elastic device which opposes the thrust action applied by the fluid. The first and the second elastic devices have different rigidities so as to induce the displacement of the second piston only after having reached a predetermined stroke of the first piston, under the thrust action of said fluid.

25 Claims, 8 Drawing Sheets

(56) References Cited

U.S. PATENT DOCUMENTS

| | | | | |
|---|---|---|---|---|
| 9,139,168 | B2 * | 9/2015 | Jeon | B60T 7/04 |
| 9,290,163 | B2 * | 3/2016 | Ryu | B60T 8/409 |
| 10,773,697 | B2 * | 9/2020 | Weh | F15B 15/24 |
| 11,059,465 | B1 * | 7/2021 | Weh | B60T 7/042 |
| 11,312,349 | B2 * | 4/2022 | Park | B60T 8/409 |
| 11,465,600 | B2 * | 10/2022 | Esandi Murguialday | B60T 7/042 |
| 11,780,417 | B2 * | 10/2023 | Park | B60T 13/745 303/113.4 |
| 2002/0084690 | A1 * | 7/2002 | Zehnder, II | B60T 8/409 303/3 |
| 2014/0117602 | A1 * | 5/2014 | Jeon | B60T 11/18 267/170 |
| 2014/0117749 | A1 | 5/2014 | Yang et al. | |
| 2014/0360177 | A1 * | 12/2014 | Ryu | G05G 5/03 60/556 |
| 2014/0361473 | A1 * | 12/2014 | Ryu | B60T 7/06 267/140.2 |
| 2015/0166023 | A1 * | 6/2015 | Ryu | B60T 13/662 303/3 |
| 2015/0375721 | A1 * | 12/2015 | Lee | B60T 8/4086 303/113.4 |
| 2016/0031424 | A1 * | 2/2016 | Weh | B60T 8/409 60/533 |
| 2016/0114769 | A1 * | 4/2016 | Kim | B60T 7/042 303/3 |
| 2017/0334416 | A1 * | 11/2017 | Ryu | B60T 8/4081 |
| 2019/0232934 | A1 * | 8/2019 | Weh | B60T 8/409 |
| 2021/0129814 | A1 * | 5/2021 | Esandi Murguialday | B60T 13/745 |
| 2024/0294154 | A1 * | 9/2024 | Xu | G05G 5/03 |

FOREIGN PATENT DOCUMENTS

| | | | |
|---|---|---|---|
| CN | 103863288 | A | 6/2014 |
| CN | 104228790 | A | 12/2014 |
| CN | 104640752 | A | 5/2015 |
| CN | 107107883 | A | 8/2017 |
| CN | 109733356 | A | 5/2019 |
| CN | 209096696 | U | 7/2019 |
| DE | 102013017718 | A1 | 4/2014 |
| DE | 102014009100 | A1 | 6/2015 |
| JP | 2000135976 | A | 5/2000 |
| JP | 2000159078 | A | 6/2000 |
| JP | 2004330966 | A * | 11/2004 |
| JP | 2005112034 | A | 4/2005 |
| JP | 2006199195 | A | 8/2006 |
| JP | 2008284941 | A | 11/2008 |
| JP | 2009143302 | A | 7/2009 |
| JP | 4496969 | B2 | 7/2010 |
| JP | 5000376 | B2 | 8/2012 |
| KR | 20140143889 | A | 12/2014 |

OTHER PUBLICATIONS

Euopean Patent Office, International Search Report and Written Opinion in Application No. PCT/IB2020/061930, dated Oct. 3, 2021, 11 pages, Rijswijk, Netherlands.

Italian Patent Office, Italian Search Report in Application No. IT 2019000025318, dated May 20, 2020, 2 pages.

Japanese Patent Office, Office Action in Application No. JP2022-538807, dated Dec. 25, 2024, 8 pages.

* cited by examiner 8
7
50
6
5
4
3
2
1

19
18
16
17
15
14
13
12
11
60
8
10
9

18
11
36
28
27
29
29
15
29
27
29
13

ADJUSTABLE PRESSURE SIMULATOR DEVICE FOR VEHICLE BRAKING SYSTEMS OF THE BRAKE-BY-WIRE TYPE

CROSS-REFERENCE TO RELATED APPLICATIONS

This application is a National Phase Application of PCT International Application No. PCT/IB2020/061930, having an International Filing Date of Dec. 15, 2020 which claims priority to Italian Application No. 102019000025318 filed Dec. 23 2019, each of which is hereby incorporated by reference in its entirety.

FIELD OF APPLICATION

The present invention relates to an adjustable pressure simulator device for vehicle braking systems of the brake-by-wire type.

This invention is applied to the technical field of brake system actuators for motor vehicles and motorcycles.

BACKGROUND

In traditional braking systems, the actuating device is a hydraulic master cylinder that delivers pressurized fluid. Such pressurized fluid, after intermediate passages, reaches the brake calipers and applies a force on the caliper pistons which, in turn, act on a brake disc, thereby generating the braking force necessary for a given deceleration of the vehicle. The peculiarity is in that the actuating system is hydraulically connected to the braking force generating system, so the rigidity of the brake cylinders is constrained by the physical characteristics of the entire system.

In brake-by-wire systems, on the other hand, the actuation device is electrically connected to the rest of the braking system, but not hydraulically. This means that the force applied by the driver (on the lever or pedal) is converted into an electrical signal via pressure, force or stroke transducers. This signal is then processed by the control unit which controls the braking system actuators.

Since the two systems are separate, the master cylinder is replaced by a master cylinder simulator, i.e. a device which simulates the feel and rigidity a driver perceives when pressing the brake actuation control in a conventional hydraulic brake system.

The rigidity of the simulator, both for pedal simulators (cars and motorcycles) and for lever simulators (motorcycles), can be designed at will, according to requirements, because the link between the two systems is only on software level, so programmable at will. In other words, the actuating force characteristic of the control can be easily and quickly changed relative to the deceleration desired by the user.

In brief, in traditional braking systems, the brake actuation control is hydraulically connected to the rest of the braking system, so the rigidity characteristic of the lever or pedal is constrained and cannot be modified at will.

In brake-by-wire systems, instead, since the two systems are decoupled, the rigidity characteristic is set by the master cylinder simulator designer, the objective of which is typically to emulate the characteristics of the traditional hydraulic braking system.

Also in these systems, until now, the possibility of modifying some aspects of the rigidity characteristic by the driver has not been implemented, so that the driver can set them in a preferred manner and obtain the most comfortable feeling for their driving style. The typical rigidity curve of a brake master cylinder is in theory distinguished by three distinct rigidity stretches, although macroscopically a "less sensitive" driver clearly distinguishes two.

A typical rigidity curve is formed as follows (FIG. 1):

- First stretch with low rigidity, because the advancement of the master cylinder piston does not pressurize the fluid until the feeding hole which connects the master cylinder and the fluid reservoir is closed;
- Second stretch with medium rigidity, in which the advancement of the piston generates the pressure necessary to recover the roll-back of the brake caliper pistons, i.e. to recover all the play and send the pistons into contact with the back of the backplate and make the braking system "ready" to deliver braking force;
- Third stretch with maximum rigidity, in which the advancement of the piston generates the effective pressure necessary to deliver the braking force. The rigidity is due to the expansion capacity of the entire system relative to the operating pressure (absorption).

The first two rigidity stretches tend to be confused with each other, while the variation in the rigidity of the last stretch is clearly perceptible by any driver.

In the known brake pump simulators, typically car brake pedals, this typical rigidity characteristic is replicated by means of systems of springs in series and appropriately sized non-linear spring end stop, or elastic elements made of elastomeric material, shaped to have a strongly non-linear characteristic. The limit of these known systems is that they are not adaptable to the needs of the single user; in other words, they are closed systems, which cannot be modified or customized by the final user, according to their own characteristics/preferences.

SUMMARY

The need is therefore increasingly felt to solve the drawbacks and limitations mentioned above with reference to the prior art.

Such need is met by a braking system for vehicles according to the claims.

In particular, such a need is met by an adjustable pressure simulator device for vehicle braking systems of the brake-by-wire type, comprising

- an absorber body enclosing a first cylinder and a second cylinder fluidically communicating with each other and at least partially filled with a fluid,
- wherein the first cylinder houses a first piston subject to the thrust action of said fluid and biased by first elastic means which oppose said thrust action applied by said fluid,
- wherein the second cylinder houses a second piston subject to the thrust action of said fluid and biased by second elastic means which oppose the thrust action applied by said fluid,
- wherein the first and the second elastic means have different rigidity.

According to a possible embodiment, the first cylinder comprises first adjustment means of the rigidity of said first elastic means.

According to a possible embodiment, the first adjustment means comprise a first end stop defining said predetermined stroke of the primary piston.

According to a possible embodiment, said first end stop consists of a front face of a stroke adjustment drum, housed in the first cylinder.

According to a possible embodiment, said stroke adjustment drum is externally threaded and can be either screwed or unscrewed through the rotation of a primary knob, with which a prismatic coupling is made, said primary knob being accessible from the outside of the absorber body.

According to an embodiment, said stroke adjustment drum is externally threaded and can be either screwed or unscrewed by rotation of an electro-actuated component or actuated by a hydraulic or pneumatic system.

According to a possible embodiment, the first elastic means comprise a helical spring which opposes the motion of the first piston by discharging the reaction force on a preload screw.

According to a possible embodiment, said preload screw is externally threaded and is screwed onto a thread made in an internal diameter of the stroke adjustment drum.

According to a possible embodiment, the second elastic means have greater rigidity than the first elastic means and comprise a plurality of springs arranged in series with each other.

According to a possible embodiment, the secondary piston is in mechanical balance between the springs in series and a reaction spring which is more yielding than said springs in series.

According to a possible embodiment, the second cylinder comprises second means for adjusting the rigidity of said elastic means.

According to an embodiment, said second adjustment means comprise a selector drum on which the second elastic means apply reaction, said selector drum being rotatable inside the second cylinder to selectively lock at least one of said second elastic means, the selector drum being provided with an operating knob that can be actuated from outside the absorber body.

According to a possible embodiment, the selector drum is actuated by hydraulic and/or electrical actuating means.

According to a possible embodiment, the selector drum is shaped so that as a function of its rotation it can lock intermediate discs interposed between said springs in series to lock and unlock said discs and the stroke/deformation of the respective springs.

According to a possible embodiment, said intermediate discs are guided by a rod of the second piston and comprise an anti-rotation tooth inserted in a corresponding groove made in said rod housed, in turn, in the second cylinder with a positive coupling that prevents its rotation. The rod which drives the intermediate discs may be a part of the second piston (i.e., in one piece with the second piston) or it may be an additional component on which the hydraulic force acting on the piston is discharged (i.e., an element which is in turn pushed by the second piston).

According to a possible embodiment, 'm' intermediate discs are provided, each with a number 'n' of fins, and the selector drum is rotatable by angles equal to 360/(n*m+n), to allow the coupling or uncoupling with the first intermediate disc and the second intermediate disc, alternatively.

According to a possible embodiment, the simulator device comprises a safety locking mechanism configured to ensure the correct positioning of the selector drum and the operating knob connected to it according to predetermined angular positions.

According to an embodiment, an angular end stop of the operating knob relative to the absorber body, fitted with a tooth obtained on an external front face of the absorber body, which forms said angular end stop with a respective hollow made in the operating knob.

According to a possible embodiment, the first and second cylinder are fluidically connected to each other by means of a common supply channel, at least partially contained in said absorber body.

The present invention further relates to a brake-by-wire type braking system comprising:

- at least one adjustable pressure simulator device,
- a manual actuation device, such as a lever or a pedal, to apply the braking action demand, said manual actuation device being connected as output to a pressure fluid supply line, fluidically connected to said first and second cylinders of the absorber body.

DESCRIPTION OF THE DRAWINGS

Further features and advantages of the present invention will be more comprehensible from the following description of preferred embodiments given by way of non-limiting examples, in which.

Elements or parts in common to the embodiments described will be indicated hereafter using the same reference numerals.

DETAILED DESCRIPTION

Figure 1:
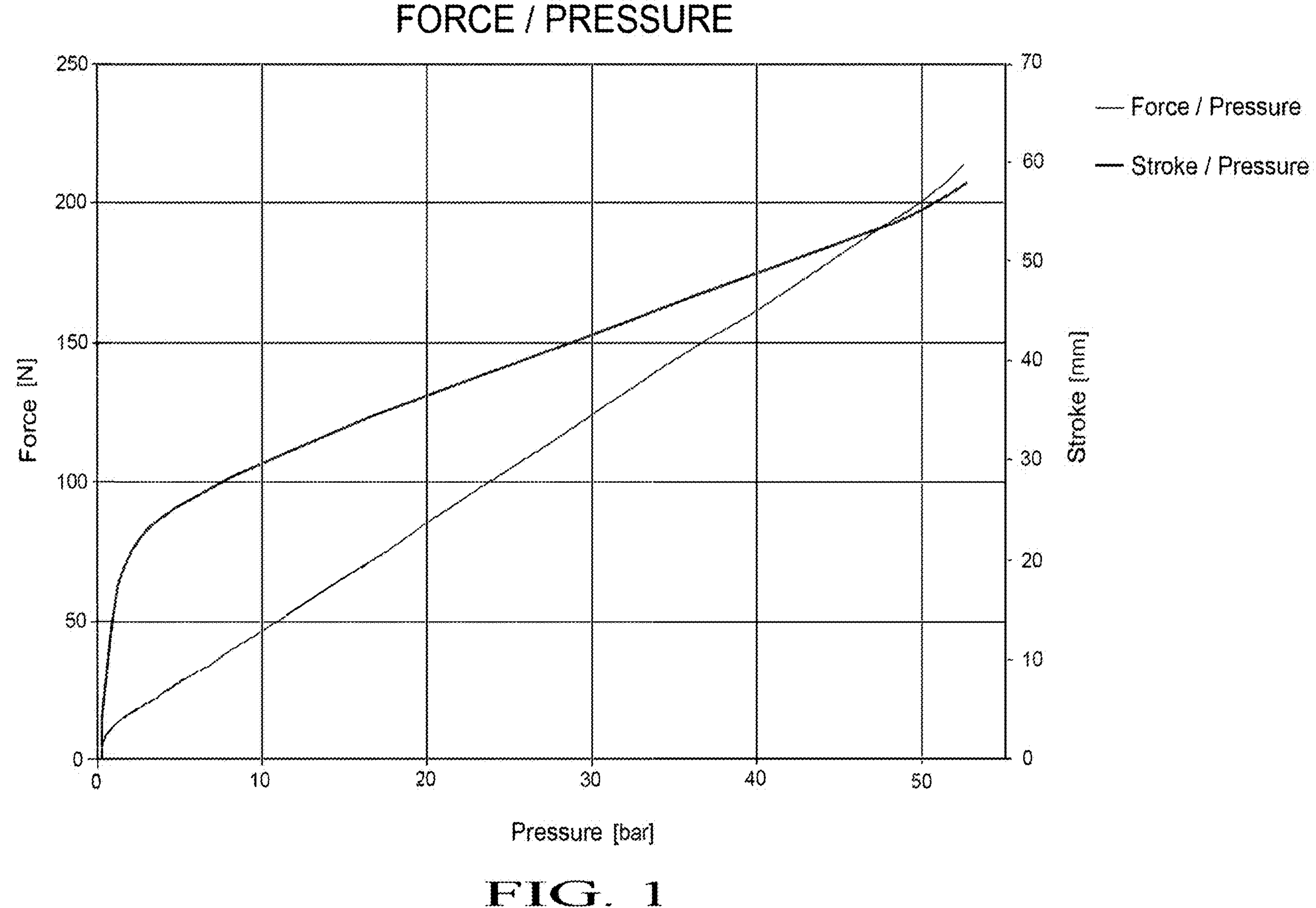
FIG. 1 shows a typical rigidity curve for a brake master cylinder of the prior art.
Figure 2:
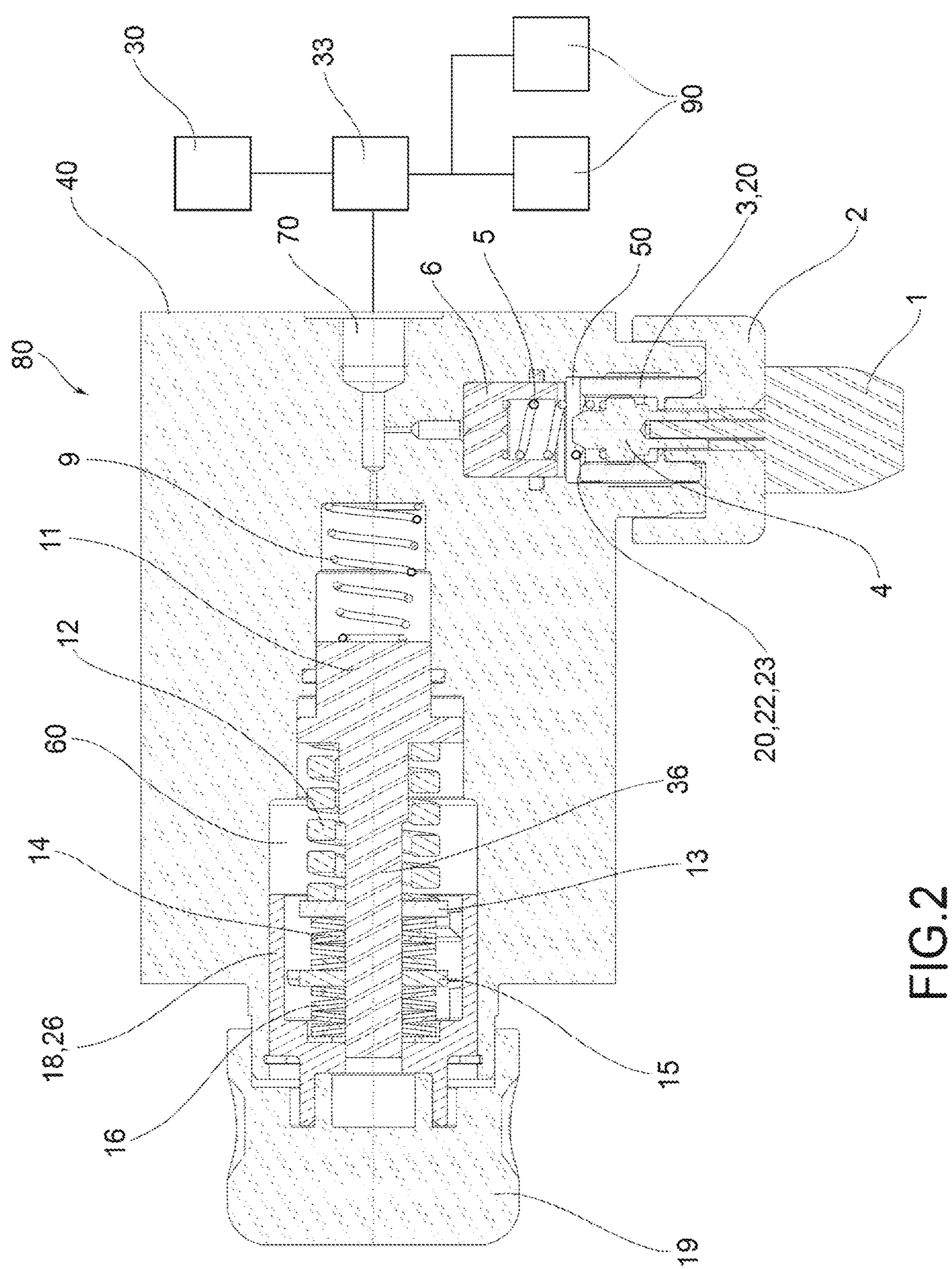
FIG. 2 shows a section view of a pressure simulating device in a braking system according to the present invention.
Figure 3:
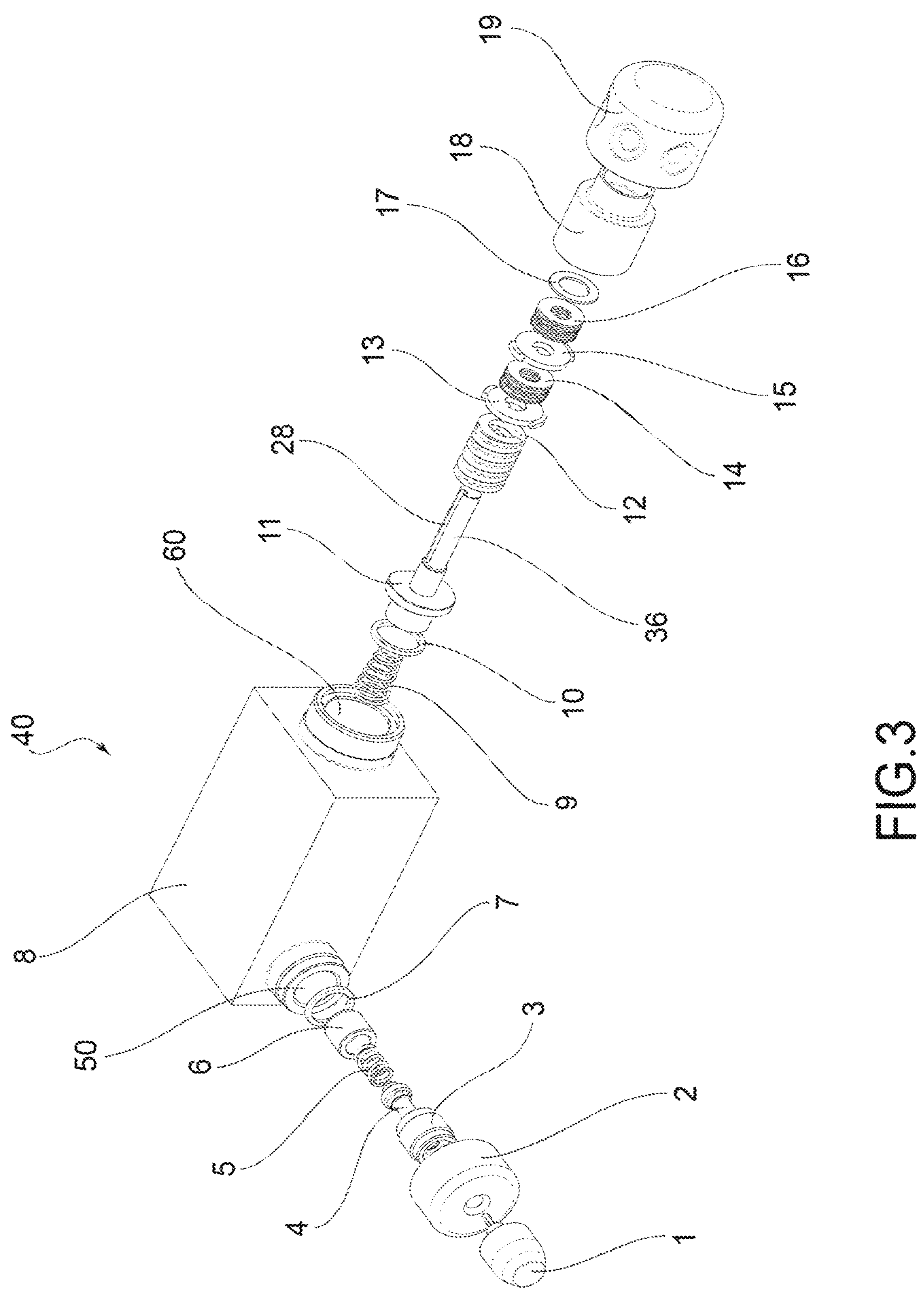
FIGS. 3-8 are perspective section views, with parts separated, of some components of the pressure simulator device in FIG. 2.
Figure 4:
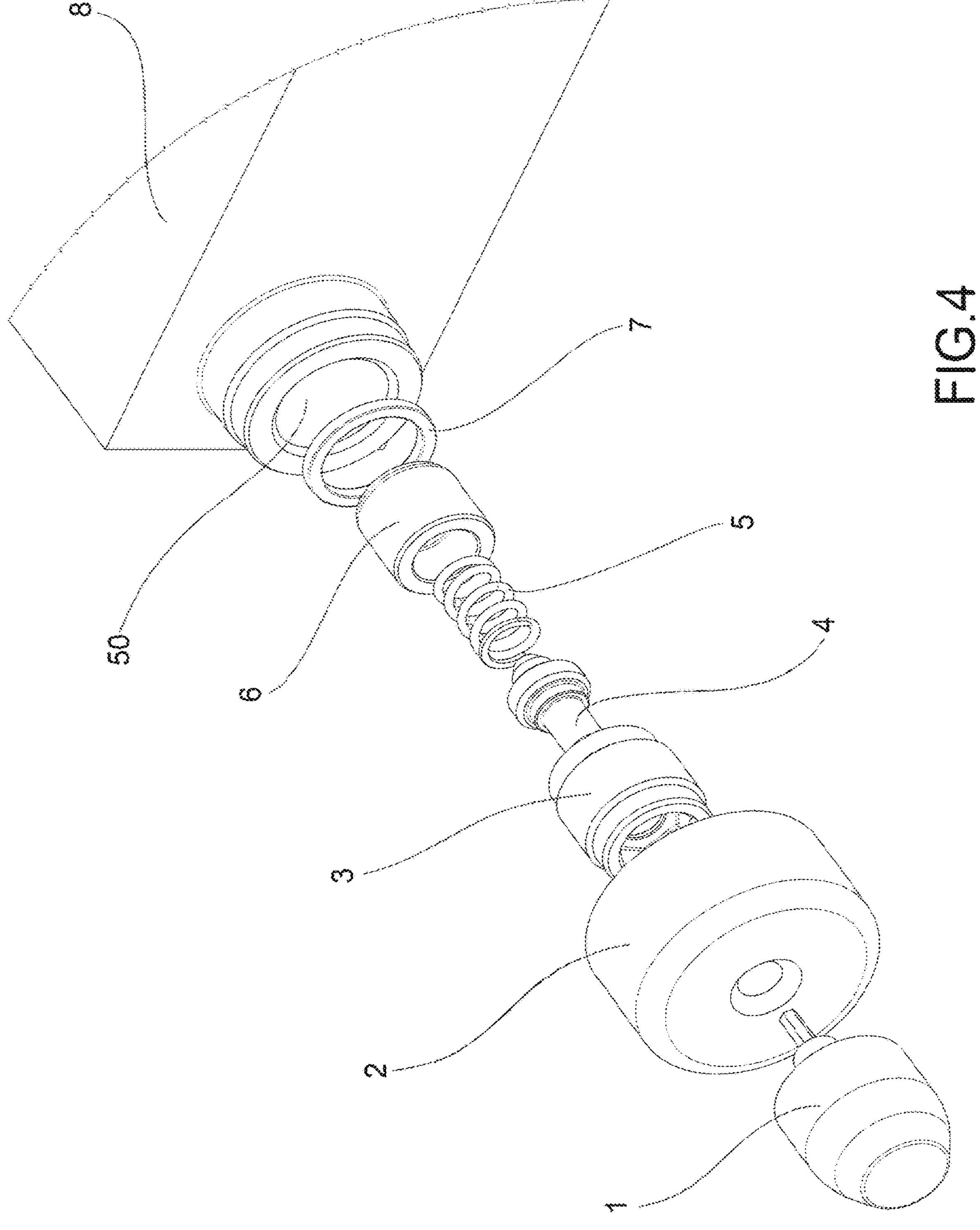
Figure 5:
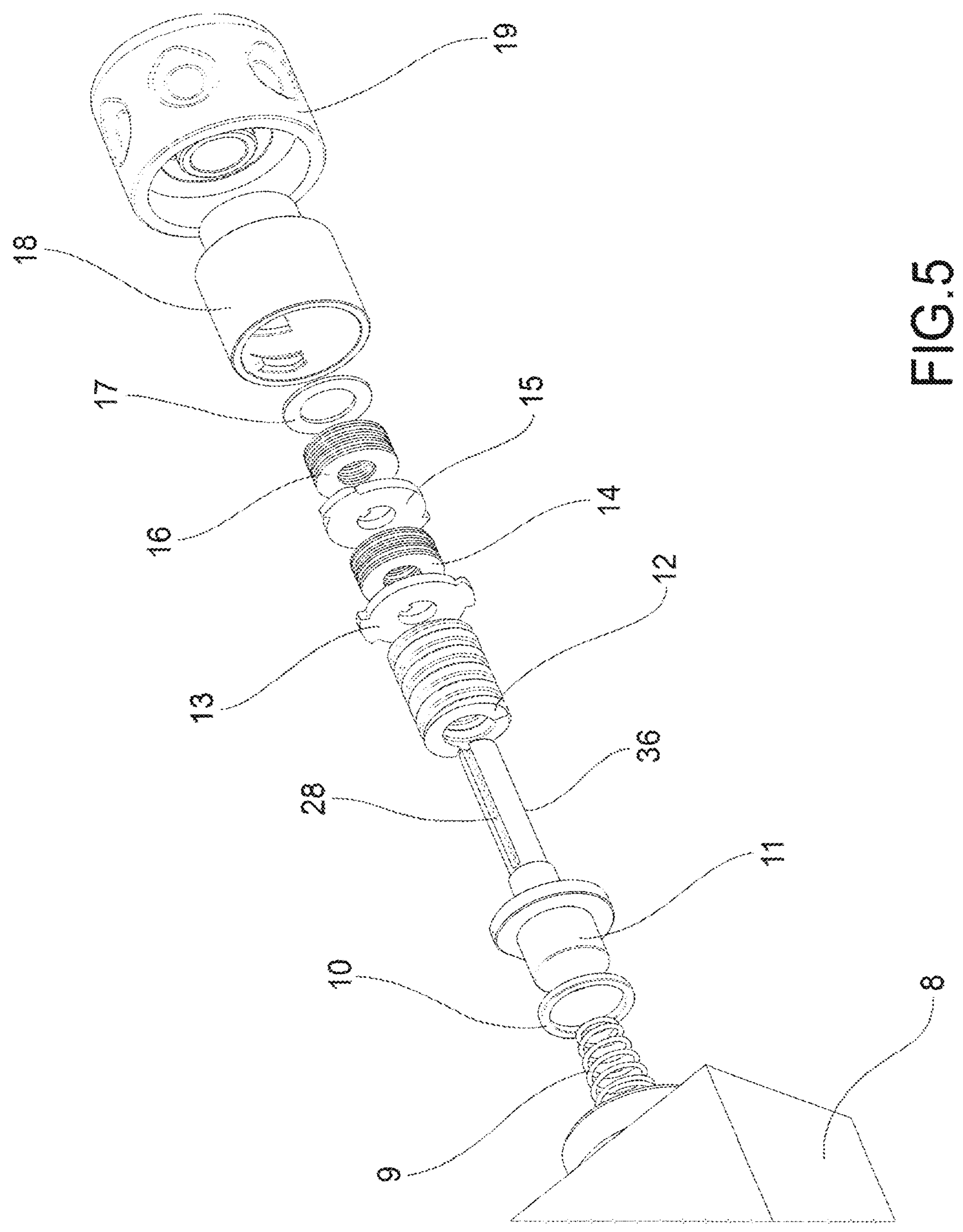
Figure 6:
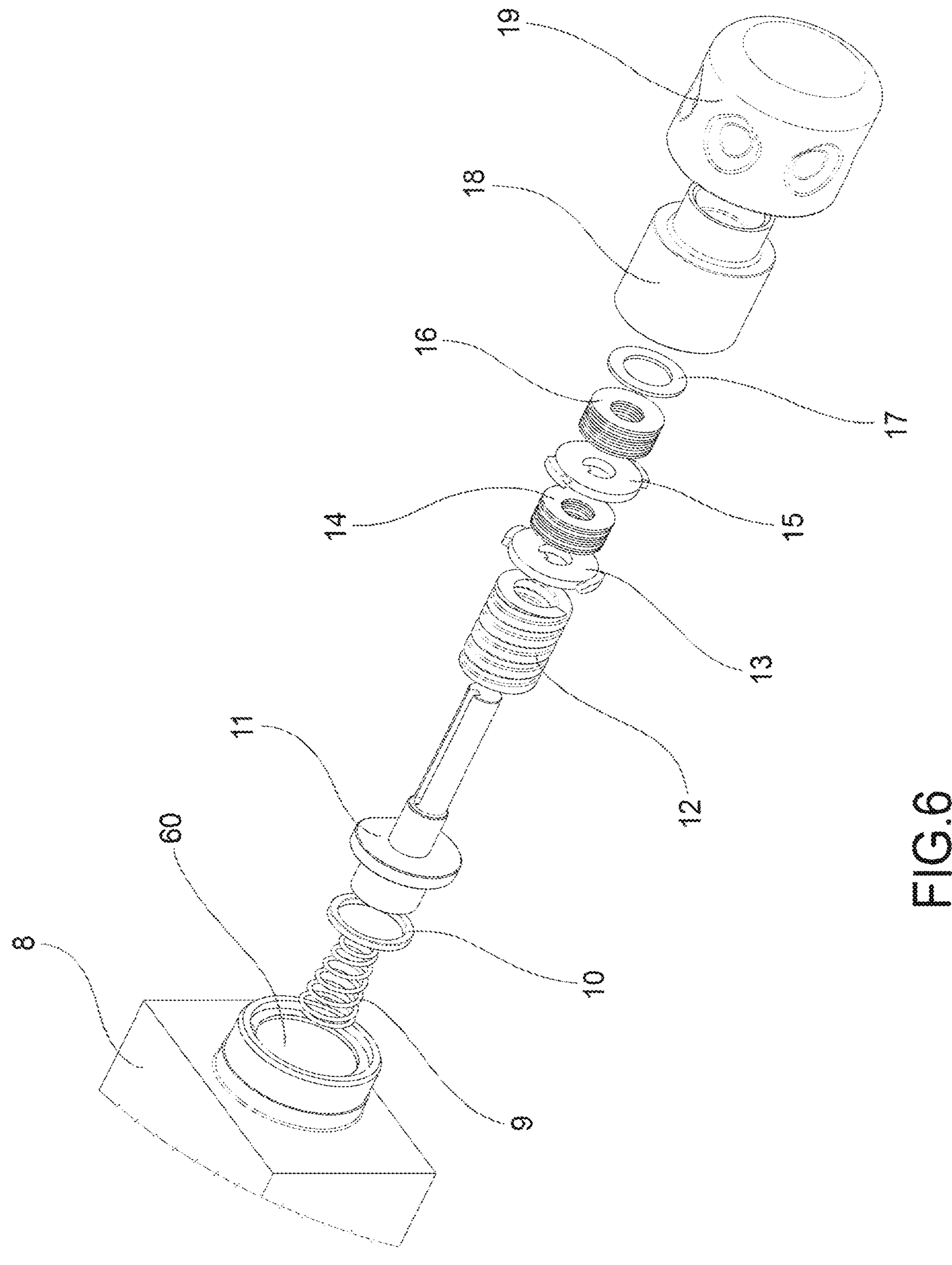
Figure 7:
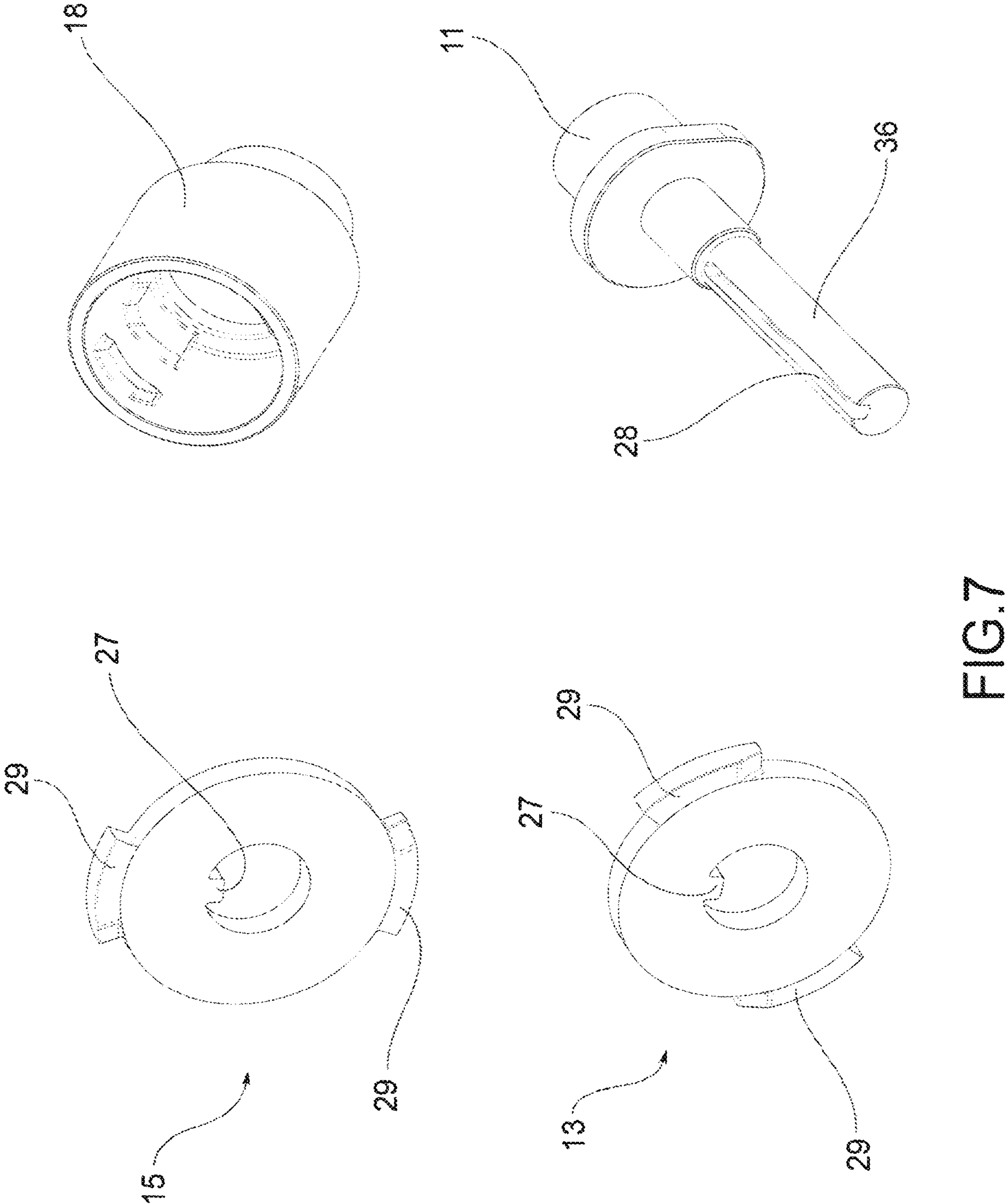
Figure 8:
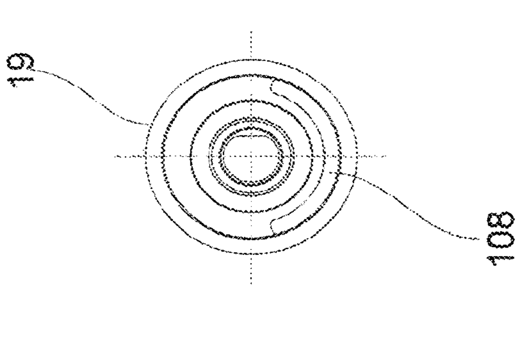
Figure 8:
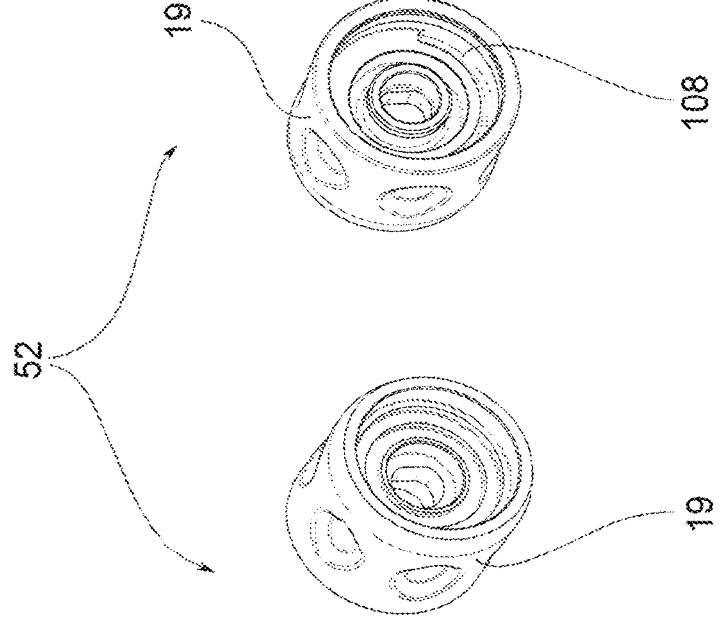
Figure 8:
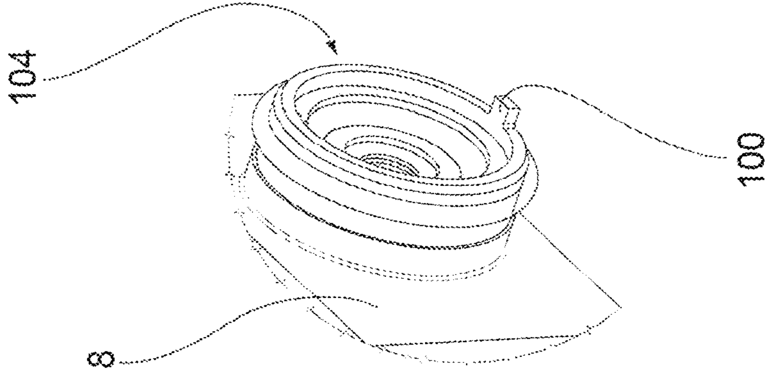

With reference to the aforementioned figures, reference numeral 40 indicates an adjustable pressure simulator device 40 for vehicle brake system 80 of the brake-by-wire type as a whole.

For the purposes of the present invention, the specific type of braking devices employed in the braking system 80, which usually, but not necessarily, comprise disc brakes 90, is not relevant.

The adjustable pressure simulator device 40 comprises an absorber body 8 which encloses at least one first cylinder 50 and at least one second cylinder 60 fluidically communicating with each other and at least partially filled with a fluid, such as a brake fluid.

According to a possible embodiment, the first cylinder 50 and the second cylinder 60 are fluidically connected to each other by means of a common supply channel 70, at least partially contained in said absorber body 8.

The brake-by-wire type braking system 80 comprises the adjustable pressure simulator device 40 and a manual actuation device 30, such as a lever or pedal, for applying the braking action request. Said manual actuation device 30 is connected in output, by means of a brake master cylinder 33, to said pressurized fluid supply channel 70, fluidically connected with said first and second cylinders 50,60 of the absorber body 8.

The first cylinder 50 houses a first piston 6 subject to the thrust action of said fluid and influenced by first elastic means 5 which oppose said thrust action exerted by said fluid.

The second cylinder 60 houses a second piston 11 subject to the thrust action of said fluid and biased by second elastic means 9,12,14,16 which oppose the thrust action exerted by said fluid.

The first elastic means 5 and the second elastic means 12,14,16 have different rigidity.

In particular, the second elastic means 12,14,16 have higher rigidity than the first elastic means 5. In this manner, before the first piston 6 reaches the end stop, i.e. during the first absorption phase, both the pistons 6,11 move under the thrust action of the fluid. However, being the first cylinder 50 much more yielding and being the second piston 11 in mechanical balance interposed between the second elastic means 12,14,16, during the first phase of absorption, the second piston 11 moves by a much smaller length than that of the first piston 6, practically negligible to the "external effects". "External effects" means the resulting rigidity when the brake lever is actuated.

More in detail, given K1 and K2 as the rigidities (to the external effects) of the first and second absorbers, the rigidity Kp (to the external effects) given by the spring which opposes the motion of the brake master cylinder piston (lever or pedal) and the preload P1 (to the external effects) of the first absorber (P2 is equal to zero to the external effects because the second piston 11 is in mechanical balance between the two elastic means) are:

- the movement of the lever until the closing of the master cylinder feeding hole: resulting rigidity given by Kp;
- the movement of the lever until it reaches the value of pressure P1 to overcome the preload P1, condition of incipient motion of the first piston 6 (the second piston 11 is free to move under the effect of the pressure from P0, system pressure at rest, to P1): the resulting rigidity is given by the rigidity of Kp and K2 in parallel;
- the movement of the lever until the first piston 6 reaches the end stop; the resulting rigidity is given by the parallel rigidity of Kp and the rigidity of K1 and K2 in series;
- the movement of the lever until it reaches the end stop.

The resulting rigidity is given by the parallel rigidity of Kp and K2.

According to an embodiment, the first cylinder 50 comprises first means for adjusting the rigidity 20 of said first elastic means 5.

For example, said first means of adjustment of the rigidity 20 of the first elastic means 5 comprise a first end stop 22 defining said predetermined stroke of the first piston 6.

For example, said first end stop 22 comprises a front face 23 of a stroke adjustment drum 3, housed in the first cylinder 50.

According to an embodiment, the stroke adjustment drum 3 is externally threaded and can be screwed or unscrewed through the rotation of a primary knob 2, with which a prismatic coupling is made, said primary knob 2 being accessible from the outside of the absorber body 8.

According to a possible embodiment, said stroke adjustment drum 3 is externally threaded and can be screwed or unscrewed by rotation of an electro-actuated component or actuated by a hydraulic or pneumatic system.

According to a possible embodiment, the first elastic means 5 comprise a helical spring which opposes the motion of the first piston 6 by discharging the reaction force on a preload screw 4.

Said preload screw 4 is externally threaded and is screwed onto a thread made in an inner diameter of the stroke adjustment drum 3. The preload screw 4 is rotationally integral with a secondary knob 1, accessible from the outside with respect to the absorber body 8. Said secondary knob 1 is preferably coaxial with respect to said primary knob 2.

As mentioned, the second elastic means 12,14,16 have greater rigidity than the first elastic means 5 and comprise a plurality of springs arranged mutually in series.

In particular, the second piston 11 is in mechanical balance between the springs in series 12,14,16 and a reaction spring 9 more yielding than said springs in series 12,14,16.

Preferably, the second cylinder 60 comprises second means for adjusting the rigidity 26 of said first elastic means 12,14,16.

For example, the second rigidity adjustment means 26 comprise a selector drum 18 on which the second elastic means 12,14,16 apply a reaction, said selector drum 18 being rotatable within the second cylinder 60 to selectively lock at least one of said second elastic means 12,14,16.

The selector drum 18 is, in turn, provided with an operating knob 19 which can be operated from outside the absorber body 8.

According to a possible embodiment, the selector drum 18 is actuated by hydraulic and/or electrical actuating means.

The selector drum 18 is shaped so that as a function of its rotation it can lock intermediate discs 13,15 interposed between said springs in series 12,14,16 to lock and unlock said intermediate discs 13,15 and the stroke/deformation of the respective springs 12,14,16.

According to a possible embodiment, the intermediate discs 13,15 are guided by a rod 36 of the second piston 11 and comprise an anti-rotation tooth 27 inserted in a corresponding groove 28 made in said rod 36 housed, in turn, in the second cylinder 60 with a positive coupling that prevents its rotation.

The rod 36 driving the intermediate discs 13,15 may be a part of the second piston 11 (i.e., in one piece with the second piston 11) or it may be an additional component on which the hydraulic force acting on the second piston 11 is discharged (i.e., an element which is pushed, in turn, by the second piston 11).

According to a possible embodiment, 'm' intermediate discs 13,15 are each provided with a number 'n' of fins 29, and the selector drum 18 is rotatable by angles equal to 360/(n*m+n), to allow the coupling or uncoupling with the first intermediate disc 13 and the second intermediate disc 15, alternatively.

Therefore, such a selective coupling and decoupling occurs by multiples of 60 degrees, assuming that the fins 29 of each intermediate disc 13,15 are equal in number to the number of fins 29 present in each functional portion of the selector drum 18, and that said fins 29 all have the same angular extension or amplitude.

According to a possible embodiment, the adjustable pressure simulator device 40 comprises a safety locking mechanism 52 configured to ensure the correct positioning of the selector drum 18 and the operating knob 19 connected to it according to predetermined angular positions.

According to an embodiment, to prevent the user from operating the unlocked actuating knob 19 up to values out of the range of use (−60°/60°), an angular end stop of the actuating knob 19 relative to the absorber body has been implemented; it consists of a tooth 100 obtained on an external front face 104 of the absorber body 8, which forms the angular end stop with a respective hollow 108, of limited angular amplitude, obtained in the actuating knob 19.

The operation of an adjustable pressure simulator device according to the present invention will now be described.

Therefore, as seen in particular, the two cylinders 50,60 are characterized by a significantly different rigidity in the first actuation part of the brake master cylinder 33, mainly the first cylinder 50 absorbs the fluid pressure.

When the first piston 6 of the first cylinder 50 reaches the end stop (if the demand for braking action continues and is increased by means of the lever or pedal device), the fluid can only flow into the second cylinder 60, which has a much higher rigidity than the first cylinder 50. In this manner, the typical rigidity curve of master brake cylinder (see FIG. 1) is replicated; the most yielding cylinder (the first cylinder 50 in this case) is responsible for the second stretch of the rigidity curve, while the most rigid cylinder (the second cylinder 60 in this case) is responsible for the third stretch of the rigidity curve (FIG. 1). The first stretch of the rigidity curve, instead, remains unchanged, because it is determined only by the stroke-free play of the brake master cylinder 33, during which the fluid pressure does not increase, and therefore does not move the pistons 6,11 of the two cylinders 50,60 respectively.

In the first cylinder 50, the stroke of the first piston 6 depends on the axial position of the abutment plane of the piston itself at end stop.

This plane consists of the front face 23 of the stroke adjustment drum 3.

This stroke adjustment drum 3 is externally threaded and can be screwed or unscrewed by turning the primary knob 2, with which a prismatic coupling is made. Therefore, by rotation of the primary knob 2, the stroke adjustment drum 3 can be advanced or retracted, thus varying the available stroke of the first piston 6. This adjustment makes it possible to change the position of the elbow point of the rigidity curve (FIG. 1).

The helical spring (first elastic means) 5 which opposes the motion of the first piston 6 discharges the reaction force on the externally threaded preload screw 4, which is screwed on the thread obtained in the inner diameter of the stroke adjustment drum 3.

By operating the secondary knob 1, the preload screw 4 is tightened, e.g. by means of a hexagonal wrench integral with the secondary knob 1. By tightening the preload screw 4, it advances by increasing the compression preload of the helical spring 5 (first half spring).

This further adjustment may be useful during the tuning phase of the system, to select the correct preload of the first elastic means 5, to ensure the correct return of the first piston 6 of the first cylinder 50 and the correct level of starting force, i.e. the force perceived following the completion of the stroke-free play of the brake master cylinder 33.

The second cylinder 60 has a higher rigidity determined by the springs arranged in series 12,14,16, which react on a slewing ring 17 resting on the selector drum 18. The second piston 11 is in mechanical balance between the series springs 12,14,16 and the extremely more yielding reaction spring 9. In the unlocked configuration, the motion rigidity of the second piston 11 is minimal and is given by the rigidity of the three springs in series 12,14,16: a front spring 12, an intermediate spring 14 and a rear spring 16.

The stroke adjustment drum 3 is mounted with interference to the operating knob 19, by means of which the angular position of the stroke adjustment drum 3 within the second cylinder 60 can be changed. The rotation of the stroke adjustment drum 3 by 60° causes the first intermediate disc 13 to be locked, while rotation by −60° causes the second intermediate disc 15 to be locked.

In the first case, since the reaction plane of the front spring 12 is locked, only the latter works in compression when the system goes into pressure, and therefore the rigidity of the pressure simulator device 40 is equal to the rigidity of the single front spring 12, therefore maximum. In the second case, however, the front spring 12 works in series with only the intermediate spring 14, and therefore the overall rigidity is intermediate.

In the configuration corresponding to the minimum rigidity, i.e., when the fins 29 of the selector drum 18 are not engaging with the fins 29 of the intermediate discs 13,15, the intermediate discs 13,15 are thus free to the axial movement. In this condition, the second elastic means work in series and therefore the overall rigidity is minimal.

The intermediate discs 13,15 are locked as follows. The intermediate discs 13,15 are guided by the piston rod of the “secondary piston” and have the “anti-rotation tooth” inserted in the “hollow” of the piston rod. The latter is mounted in the housing with a positive coupling that prevents the rotation thereof. In this manner, the intermediate discs 13,15 are also constrained to rotate. In the unlocked configuration, the fins 29 of the stroke adjustment drum 3, those of the first disc 13 and those of the second disc 15 are mutually offset by an angle of 60° so that their total sum is 360° (6 fins in total). By rotating the stroke adjustment drum 3 by 60°, its front fins 29 engage the blades 29 of the first disc 13, by virtue of the chamfer on one side. This 60° rotation causes the disc to move forward, which is made possible by virtue of the reaction spring 9, which, being extremely yielding, fully absorbs the motion of the disc without actually increasing the preload of the helical spring 12. Rotating the stroke adjustment drum 3 by −60°, however, the same occurs for the secondary disc 15.

As can be appreciated from the description above, the present invention makes it possible to overcome the drawbacks presented in the prior art.

Indeed, the suggested solution is composed of absorbers and mechanisms, such as to make customizable the rigidity curve of the simulator. Therefore, in contrast to known devices for which each simulator corresponds to a nominal rigidity curve, by virtue of the present invention with a single product it is possible to test a range of different rigidity curves among them.

Specifically, the driver can vary two fundamental aspects as desired, namely:

1) The position of the elbow point of the rigidity curve, i.e. the angle of the simulator pedal or lever beyond which the rigidity increases significantly. Typically, a brake pedal or lever with a shorter low-rigidity stretch is typical for sports vehicles, as the brake must be ready and deliver braking force in the shortest possible time. In touring vehicles or vehicles suitable for long journeys, the low-rigidity stretch is longer, to improve driver comfort and avoid unintended hard braking. In the proposed solution, this variation can be applied continuously or discretely.

2) The rigidity value (slope of the Force-Stroke graph) of the curve stretch at maximum rigidity, i.e. the stretch where the actual braking force is applied. A brake master cylinder with a particularly rigid last stretch of the curve is typically more suitable for the drivers who are used to modulating deceleration in force, i.e. are more sensitive to variations in their own force on the brake pedal or lever. Conversely, a more yielding curve is usually more suitable for drivers who modulate deceleration while running, i.e. are more sensitive to movements of the toe or fingers.

Therefore, the presented system makes it possible to overcome the limitations of the current brake master cylinders related to the fact of being hydraulic and connected to the rest of the braking system. By virtue of this absorber device, BbW systems acquire even more interest because it is possible to customize the feeling of the brake levers and pedals. Indeed, this mechanism was designed for brake levers for motorcycle applications, but this does not prevent the same type of absorber from being applied also in car brake pedals, replacing the knobs with small position-controlled servomotors.

In conclusion, the system offers the driver the possibility to operate on three main parameters of the brake master cylinder rigidity curve, making it more suitable to their preferences and driving style. A more interactive and customizable driving experience is thus offered. If it were not desired to give freedom to the driver to operate directly on the parameters of the rigidity curve, this system is interesting for the auto/motorcycle manufacturers because they could set themselves these parameters of the rigidity curve based on the preferences of the customers, lock the mechanisms and then sell the product. They can thus offer their customers a very wide range of brake levers with different rigidity curves, with only one product in the catalog.

A person skilled in the art can make numerous changes and variants to the solutions described above, all contained within the scope of protection defined by the following claims to satisfy contingent, specific needs.

The invention claimed is:

1. Adjustable pressure simulator device for vehicle braking systems of the brake by wire type, comprising

- an absorber body enclosing at least one first cylinder and at least one second cylinder fluidically communicating with each other and at least partially filled with a fluid,
- wherein the first cylinder houses a first piston subject to the thrust action of said fluid and influenced by first elastic means which oppose said thrust action exerted by said fluid,
- wherein the second cylinder houses a second piston subject to the thrust action of said fluid and influenced by second elastic means which oppose the thrust action exerted by said fluid,
- wherein the first elastic means and the second elastic means have different rigidity, and the first elastic means are coaxial with the first piston and the second elastic means are coaxial and concentric with the second piston, wherein the first cylinder comprises first means of adjustment of the rigidity of said first elastic means, wherein the second cylinder comprises second adjustment means of the rigidity of said second elastic means separate from the first means of adjustment, wherein said second adjustment means comprise a selector drum on which the second elastic means react, said selector drum being rotatable inside the second cylinder so as to selectively lock at least one of said second elastic means.

2. Adjustable pressure simulator device according to claim 1, wherein the first means of adjustment comprise a first end stop defining a predetermined stroke of the first piston.

3. Adjustable pressure simulator device according to claim 2, where said first end stop comprises a front face of a stroke adjustment drum, housed in the first cylinder.

4. Adjustable pressure simulator device according to claim 3, wherein said stroke adjustment drum is externally threaded and can be screwed or unscrewed through the rotation of a primary knob, with which a prismatic coupling is made, said primary knob being accessible from the outside of the absorber body.

5. Adjustable pressure simulator device according to claim 3, wherein said stroke adjustment drum is externally threaded and can be screwed or unscrewed by rotation of an electro-actuated component or actuated by a hydraulic or pneumatic system.

6. Adjustable pressure simulator device according to claim 3, wherein the first elastic means comprise a helical spring which opposes the motion of the first piston by discharging the reaction force on a preload screw.

7. Adjustable pressure simulator device according to claim 6, wherein said preload screw is externally threaded and is screwed onto a thread made in an internal diameter of the stroke adjustment drum.

8. Adjustable pressure simulator device according to claim 1, wherein the second elastic means have a greater rigidity than the first elastic means, and comprise a plurality of springs arranged in series with each other.

9. Adjustable pressure simulator device according to claim 8, wherein the second piston is in mechanical equilibrium between the plurality of springs in series and a reaction spring more yielding than said plurality of springs in series.

10. Adjustable pressure simulator device according to claim 1, wherein the selector drum is equipped with an operating knob which can be operated from outside the absorber body.

11. Adjustable pressure simulator device according to claim 10, where the simulator device comprises a safety locking mechanism configured to ensure the correct positioning of the selector drum and the operating knob connected to it according to predefined angular positions.

12. Adjustable pressure simulator device according to claim 11, wherein said safety locking mechanism comprises an angular end stop of the operating knob with respect to the absorber body, fitted with a tooth made on an external front face of the absorber body, which realizes said angular end stop with a respective hollow made in the operating knob.

13. Adjustable pressure simulator device according to claim 1, wherein the selector drum is actuated by hydraulic and/or electric actuation means.

14. Adjustable pressure simulator device according to claim 1, wherein the first and second cylinder are fluidically connected to each other by means of a common supply channel, at least partially contained in said absorber body.

15. Brake-by-wire braking system comprising:

- at least one adjustable pressure simulator device according to claim 1,
- a manual actuation device to exert the braking action demand, said manual actuation device being connected in output to a pressure fluid supply line, fluidically connected with said first and second cylinders of the absorber body.

16. Adjustable pressure simulator device according to claim 1, wherein the first elastic means are adapted to exert a first force coaxial with respect to the first piston and the second elastic means exert a second force coaxial with respect to the second piston.

17. Adjustable pressure simulator device according to claim 1, wherein the second elastic means are oriented transverse the first elastic means within the absorber body.

18. Adjustable pressure simulator device according to claim 1, wherein the first means of adjustment is oriented transverse the second means of adjustment.

19. Adjustable pressure simulator device according to claim 1, wherein the second elastic means comprises a first spring, a second spring and a third spring all in series.

20. Adjustable pressure simulator device according to claim 19, wherein the first spring is located about an operating rod of the second piston within the second cylinder, wherein the second spring is located about the operating rod of the second piston within the second cylinder, and wherein the third spring is located between the second piston and an interior end wall of the second cylinder.

21. Adjustable pressure simulator device according to claim 20, wherein selectively lockable intermediate disks are located about the operating rod among the first spring within the second cylinder.

22. Adjustable pressure simulator device for vehicle braking systems of the brake by wire type, comprising an absorber body enclosing at least one first cylinder and at least one second cylinder fluidically communicating with each other and at least partially filled with a fluid, wherein the first cylinder houses a first piston subject to the thrust action of said fluid and influenced by first elastic means which oppose said thrust action exerted by said fluid, wherein the second cylinder houses a second piston subject to the thrust action of said fluid and influenced by second elastic means which oppose the thrust action exerted by said fluid, wherein the first elastic means and the second elastic means have different rigidity, and the first elastic means are coaxial with the first piston and the second elastic means are coaxial and concentric with the second piston, wherein the first cylinder comprises first means of adjustment of the rigidity of said first elastic means, wherein the second cylinder comprises second adjustment means of the rigidity of said second elastic means separate from the first means of adjustment, wherein said second adjustment means comprise a selector drum on which the second elastic means react, said selector drum being rotatable inside the second cylinder so as to selectively lock at least one of said second elastic means, wherein the selector drum is shaped so that according to its rotation it is able to lock intermediate discs positioned between said second elastic means in series so as to lock and unlock said intermediate discs and the stroke/deformation of the second elastic means springs.

23. Adjustable pressure simulator device according to claim 22, wherein said intermediate discs are guided by a rod of the second piston and comprise an anti-rotation tooth inserted in a corresponding groove made in said rod in turn housed in the second cylinder with a shape coupling that prevents its rotation.

24. Adjustable pressure simulator device according to claim 22, wherein 'm' intermediate discs are provided, each with a number 'n' of fins, and the selector drum is rotatable by angles equal to 360/(n*m+n), so as to allow the coupling or uncoupling with the first intermediate disc and the second intermediate disc, alternatively.

25. Adjustable pressure simulator device for vehicle braking systems of the brake by wire type, comprising an absorber body enclosing at least one first cylinder and at least one second cylinder fluidically communicating with each other and at least partially filled with a fluid, wherein the first cylinder houses a first piston subject to the thrust action of said fluid and influenced by first elastic means which oppose said thrust action exerted by said fluid, wherein the second cylinder houses a second piston subject to the thrust action of said fluid and influenced by second elastic means which oppose the thrust action exerted by said fluid, wherein the first elastic means and the second elastic means have different rigidity, and the first elastic means are coaxial with the first piston and the second elastic means are coaxial and concentric with the second piston, wherein the first cylinder comprises first means of adjustment of the rigidity of said first elastic means, wherein the second cylinder comprises second adjustment means of the rigidity of said second elastic means separate from the first means of adjustment, wherein the second elastic means comprises a first spring, a second spring and a third spring all in series, wherein the first spring is located about an operating rod of the second piston within the second cylinder, wherein the second spring is located about the operating rod of the second piston within the second cylinder, and wherein the third spring is located between the second piston and an interior end wall of the second cylinder.

* * * * *